US 8,144,645 B2

(12) United States Patent
Turányi et al.

(10) Patent No.: US 8,144,645 B2
(45) Date of Patent: Mar. 27, 2012

(54) METHOD AND APPARATUS FOR ROUTE OPTIMIZATION IN A TELECOMMUNICATION NETWORK

(75) Inventors: Zoltán Richárd Turányi, Budapest (HU); Csaba Keszei, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 785 days.

(21) Appl. No.: 12/097,909

(22) PCT Filed: Dec. 23, 2005

(86) PCT No.: PCT/EP2005/057141
§ 371 (c)(1),
(2), (4) Date: Aug. 26, 2008

(87) PCT Pub. No.: WO2007/073773
PCT Pub. Date: Jul. 5, 2007

(65) Prior Publication Data
US 2008/0316956 A1 Dec. 25, 2008

(51) Int. Cl.
*H04J 1/16* (2006.01)
(52) U.S. Cl. ........................ 370/328; 370/349
(58) Field of Classification Search .................. 370/225, 370/328, 349, 351
See application file for complete search history.

(56) References Cited

U.S. PATENT DOCUMENTS

| 7,650,522 B2 * | 1/2010 | Linsley-Hood et al. ...... 713/321 |
| 2005/0165917 A1 * | 7/2005 | Le et al. ........................ 709/220 |
| 2005/0259631 A1 | 11/2005 | Rajahalme |
| 2006/0239216 A1 * | 10/2006 | Chen et al. ..................... 370/310 |
| 2008/0212478 A1 * | 9/2008 | Devarapalli et al. .......... 370/235 |

FOREIGN PATENT DOCUMENTS

| WO | WO 01/56315 A | 8/2001 |
| WO | WO 2004/045159 A | 5/2004 |
| WO | WO 2005/101788 A1 | 10/2005 |

OTHER PUBLICATIONS

Johnson, Mobility Support in IPv6, Jun. 2004.*
Johnson et al: "Network Working Group RFC 3775: Mobility support in IPv6" 'Online! Jun. 2004, IETF Internet Society (ISOC), Geneva, Switzerland, XP002369106 IETF Retrieved from the Internet URL: http//www.ietf.org/rfc/rfc3775.txt> 'retrieved on Feb. 22, 2005! Abstract, Chapters 4.1, 5,6.4, 8.1 to 8.5.

* cited by examiner

*Primary Examiner* — Xavier Szewai Wong
*Assistant Examiner* — Henry Baron (57) ABSTRACT

A method and apparatus for controlling the routing of a data packet sent from a first node towards a second node of a telecommunication network. The first node is a mobile node having an associated home network. An access router intercepts the data packet and determines whether the packet relates to a first mode of communication between the first and second nodes in which data packets generally bypass a home agent associated with the first node's home network. In a second mode of communication, home agent packets generally passed through the home agent. The access router drops the packet if the packet relates to the first mode of communication and if dropping the packet is determined to be in accordance with a pre-determined routing policy.

29 Claims, 4 Drawing Sheets

METHOD AND APPARATUS FOR ROUTE OPTIMIZATION IN A TELECOMMUNICATION NETWORK

BACKGROUND OF THE INVENTION

1. Field of the Invention

The current invention relates to routing of traffic in a telecommunication network. It has particular relevance to traffic from a mobile node in an IP-based mobile telecommunication network.

2. Description of the Related Art

When the Internet was originally devised, hosts were fixed in location and there was implicit trust between users despite the lack of real security or host identification protocols, and this situation continued even upon wider uptake and use of the technology. There was little need to consider techniques for dealing with host mobility since computers were relatively bulky and immobile.

With the revolution in telecommunications and computer industry in the early 1990's, smaller communication equipment and computers became more widely available and the invention of the World Wide Web, and all the services that emerged with it, finally made the Internet attractive for the average person. The combination of increasing usage of the network and mobile telecommunications created the need for secure mobility management in the Internet.

Taking into account the above mobility management, the Mobile IP standard (C. Perkins, "IP Mobility Support for IPv4", RFC 3220, IETF, 2002) and the Mobile IPv6 standard (D. Johnson, C. Perkins, J. Arkko, "Mobility Support in IPv6", RFC3775, IETF, 2004) have been introduced. Together these specifications are planned to provide mobility support for the next generation Internet.

An IP address describes a topological location of a node in the network. The IP address is used to route the packet from the source node to the destination. At the same time the IP address is generally also used to identify the node, providing two different functions in one entity. This can be considered to be akin to a person responding with their home address when asked who they are. When mobility is also considered, the situation becomes even more complicated: since IP addresses act as host identifiers in this scheme, they must not be changed; however, since IP addresses also describe topological locations, they must necessarily change when a host changes its location in the network.

With Mobile IP, the solution is to use a fixed home location providing a "home address" for the node. The home address both identifies the node and provides a stable location for it when it is at home. The current location information is available in the form of a care-of address, which is used for routing purposes when the node is away from home.

Cellular networks provide roaming capabilities, where visited networks provide connectivity to roaming users. The traffic of roaming users may be tunneled back to the home network or it may leave or be terminated in the visited network. Possible reasons for using home tunneling include: the ability to charge at home; enabling policy control at home; having a mobility anchor at home; providing location privacy; and allowing for the possibility that servers providing user service are in the home network. Possible reasons for local breakout include: optimal routing; shorter (and hence cheaper) access to the Internet; and access to services provided locally in the visited network.

The following two mechanisms for providing home tunneling and optimal routing (local breakout) dynamically while being reachable at the same IP address are known:

IP2, where route optimization is entirely network centric.

The Mobile IP standard, as mentioned above, where Mobile Nodes (MN) themselves send location update messages (Binding Updates, BU) to Correspondent Nodes (CN). Then Correspondent Nodes direct their traffic to the current location of the MN.

While IP2 allows full control for the network to decide routing (including home tunneling or route optimization), it is a complex system requiring IP2 to be implemented at to the visited and home networks and also in the network of the CN. Its complexity makes it unsuitable for a number of purposes.

Another form of route optimization (albeit a less powerful one) is the use of a locally-assigned IP address for communication by the MN instead of the home address. In this case, no specific mechanisms are needed to ensure direct routing between the CN and the MN; however, the transport session may break if the MN moves away. The MN may choose to initiate communication using a locally-assigned address at its own discretion.

The Mobile IP standard will now be described in more detail with reference to FIGS. 1 and 2 of the accompanying drawings.

Mobile IP is a mechanism for maintaining transparent network connectivity to and from a Mobile Node (MN), such as a mobile terminal or telephone over an IP based network. Mobile IP enables a Mobile Node to be addressed by the IP address it uses in its home network (Home Address), regardless of the network to which it is currently physically attached. Therefore, ongoing network connections to and from a Mobile Node can be maintained even as the Mobile Node is moving from one subnet to the other. Mobile IP can be implemented using IP protocol version 4, IPv4 or IP protocol version 6, IPv6. IPv6 is generally preferred as IPv4 has a number of limitations in a mobile environment. The IPv6 protocol as such is specified in RFC 2460.

In Mobile IPv6, each mobile node is always identified by its Home Address. While away from its home IP subnet (Home Subnet) a Mobile Node is also associated with a Care-of Address which indicates the Mobile Node's current location. The association of the Mobile Node's Home Address and the Care-of Address is known as Binding. A router in the Home Subnet, known as the Home Agent, maintains a record of the current Binding of the Mobile Node. The Mobile Node can acquire its Care-of Address through conventional IPv6 mechanisms called auto-configuration at the visited (or foreign) IP subnet.

Any node with which a Mobile Node is communicating is referred to as a Correspondent Node. The Correspondent Node could itself be either mobile or stationary.

There are two possible modes for communications between the Mobile Node and the Correspondent Node. The first mode, bidirectional tunneling to/from the Home Agent, does not require Mobile IPv6 support from the Correspondent Node and is available even if the Mobile Node has not registered its current Binding with the Correspondent Node. The first mode is illustrated in FIG. 1. IP packets from the Correspondent Node are routed to the Home Agent and then tunneled to the Mobile Node. Packets to the Correspondent Node are tunneled from the Mobile Node to the Home Agent ("reverse tunneled") and then routed normally from the Home Network to the Correspondent Node. In this mode, the Home Agent intercepts any IPv6 packets addressed to the Mobile Node's Home Address and each intercepted packet is tunneled to the Mobile Node's primary Care-of Address. This tunneling is performed using IPv6 encapsulation.

The second mode, referred to as 'route optimization', requires the Mobile Node to register its current binding at the Correspondent Node. The second mode is illustrated in FIG. 2. Packets from the Correspondent Node can be routed directly to the Care-of Address of the Mobile Node. When sending a packet to an IPv6 destination, the Correspondent Node checks its cached bindings for an entry for the packet's destination address. If a cached binding for this destination address is found, the node uses a new type of IPv6 routing header to route the packet to the Mobile Node by way of the Care-of Address indicated in this binding.

In this regard, a routing header may be present as an IPv6 header extension, and indicates that the payload has to be delivered to a destination socket in some way that is different from what would be carried out by standard receiver host processing. Mobile IPv6 defines a new routing header variant, the type 2 routing header, to allow the packet to be routed directly from a correspondent to the mobile node's care-of address. Use of the term "routing header" typically refers to use of a type 2 routing header. The mobile node's care-of address is inserted into the IPv6 Destination Address field. Once the packet arrives at the care-of address, the mobile node extracts the final destination address (equal to its home address) from the routing header, and delivers the packet to the appropriate socket as if the packet were addressed to the extracted address.

The new routing header uses a different type than defined for "regular" IPv6 source routing, enabling firewalls to apply different rules to source routed packets than to Mobile IPv6. This routing header type (type 2) is restricted to carry only one IPv6 address and can only be processed by the final destination and not intermediate routers.

All IPv6 nodes which process this routing header must verify that the address contained within is the node's own home address in order to prevent packets from being forwarded outside the node. The IP address contained in the routing header, since it is the mobile node's home address, must be a unicast routable address.

Furthermore, if the scope of the home address is smaller than the scope of the care-of address, the mobile node must discard the packet.

With route optimization, the Mobile Node registers its current binding at the Correspondent Node using a Binding Update message sent from the Mobile Node to the Correspondent Node (which the Correspondent Node acknowledges with a Binding Update Acknowledgement message). The Binding Update message contains as its destination address the address of the Correspondent Node. The source address of the message is the Care-of Address of the Mobile Node, whilst the home address of the Mobile Node is contained within a home address field of the message header. Route optimisation requires the inclusion of a routing header (a type 2 routing header) in the packet headers, indicating that the packets must be dealt with in a special way.

In order to enhance security of the Optimised Routing process, a "proof-of-address" mechanism may be employed. One such mechanism requires that, prior to issuing a (first) Binding Update message, a roaming Mobile Node send to a Correspondent Node a first message (HoTI) to the Correspondent Node employing route optimisation and a second message (CoTI) not employing route optimisation. The second message travels via the Home Agent whilst the second does not. The Correspondent Node replies to the first message with a first part of a random number generated by the Correspondent Node, and replies to the second message with a second part of the random number. The Mobile Node will only receive both parts of the random number if it has given both a valid Care-of Address and a valid Home Address. When the Binding Update is subsequently sent to the Correspondent Node, the Mobile Node includes both parts of the random number in the message to prove ownership of the Care-of and Home Addresses.

Once implemented, Route Optimisation allows the Mobile Node to send packets directly to the Correspondent Node. The Care-of Address is included as the source address in these "outgoing" packets. This is done by the Mobile IP protocol layer at the Mobile Node, which replaces the home address with the Care-of Address as the source address in outgoing packets. The Home Address is included in a further header field. The Mobile IP protocol layer at the Correspondent Node screens incoming mails by comparing the source addresses of the packets with Care-of Addresses held in its binding cache. If a match is found, the Care-of Address is replaced with the corresponding Home address, in the source address field, before passing the message to higher layers. Transit through the home network is thus avoided.

Considering the reverse direction, packets from the Correspondent Node can be routed directly to the Care-of Address of the Mobile Node. When sending a packet to an IPv6 destination, the Correspondent Node checks its cached bindings for an entry for the packet's destination address. If a cached binding for this destination address is found, the node substitutes the destination address for the corresponding Care-of Address, whilst including the destination address (i.e. the Home address) in a further header field. Upon receipt of a packet at the Mobile Node, the Mobile IP protocol layer replaces the Care-of Address in the destination field with the home address of the Mobile Node. The packet is then passed to higher protocol layers. Again, transit through the home network is avoided.

Routing packets directly to the Mobile Node's Care-of Address with 'route optimization' allows the shortest communications path to be used. It also eliminates congestion at the Mobile Node's Home Agent. In addition, the impact of any possible failure of the Home Agent or networks on the path to or from it is reduced.

However, the possibility of 'route optimization' that MIPv6 provides leads to a very terminal centric solution, as the establishment of home address to care-of address bindings in the correspondent node is decided, initiated and executed by the mobile node itself. This does not allow network operators to influence whether traffic is tunneled home or routed locally. For example, home networks have no influence if a particular piece of traffic is route via them or not. This is true even if the visited network fully co-operates with the home network in this regard. The simple use of a local IP address is also decided by the terminal. If (home) network control of route optimization is requested, the use of local addresses needs to be controlled too.

It is desirable to address the above-mentioned issues concerning the existing approaches.

SUMMARY OF THE INVENTION

According to a first aspect of the present invention there is provided a method of controlling the routing of data packets sent from a first node towards a second node of a telecommunication network, the first node being a mobile node having an associated home network, and the method comprising: intercepting such a data packet; determining if the packet relates to a first mode of communication between the first and second nodes in which data packets generally bypass a home agent associated with the first node's home network, through which home agent packets would generally pass in a second mode of communication between the first and second nodes different to the first mode; and dropping the packet if it is so determined and if dropping of the packet is determined to be in accordance with a predetermined routing policy.

The method may comprise determining whether the dropping of the packet is in accordance with the routing policy in dependence on the packet's destination address.

The destination address may be one of a home address and a care-of address.

The method may comprise determining whether the dropping of the packet is in accordance with the routing policy in dependence on the packet's source address.

The method may comprise determining that the packet should be dropped if the packet's source address is a local address, unless the delivery of such a packet is allowed by the routing policy according to the packet's destination address.

The method may comprise determining whether the dropping of the packet is in accordance with the routing policy in dependence on a routing header in the packet.

The method may comprise determining that the packet relates to the first mode of communication if it relates to a control message associated with the first mode.

The first mode of communication may be a route optimization mode of the Mobile IP standard and the second mode may be a bidirectional tunneling mode of the Mobile IP standard.

Control messages associated with the first mode may comprise at least one type of IPv6 mobility message.

Control messages associated with the first mode may comprise at least one of the following types of message: a Binding Update message; a Home Test Init Message; and a Care-of Test Init message.

The method may comprise determining whether the packet relates to the first mode of communication in dependence on at least one of the packet's source and destination address.

The second node may be a stationary node.

The method may further comprise sending an error message to the first node if the packet is dropped.

The error message may be an ICMP Administratively prohibited message.

The routing policy may specify at least one IP address range, the routing policy specifying for the or each range whether a packet having a source address that falls within that range is to be dropped or allowed.

The routing policy may specify at least one IP address range, the routing policy specifying for the or each range whether a packet having a destination address that falls within that range is to be dropped or allowed.

The telecommunication network may be an IP based telecommunication network.

The IP network may be based on at least one of the IP protocols IPv4 and IPv6.

The method may comprise intercepting the packet in a visited network if the first node has roamed outside of its home network into the visited network, else intercepting the packet in the home network.

The routing policy may be stored in the network entity that intercepts the packet.

The method may comprise performing the steps in an Access Router.

The method may comprise managing the routing policy from a remote location.

The method may comprise managing the routing policy remotely via management signalling.

The management signalling may use any of the Diameter or COPS protocols.

According to a second aspect of the present invention there is provided an apparatus for controlling the routing of data packets sent from a first node towards a second node of a telecommunication network, the first node being a mobile node having an associated home network, and the apparatus comprising: means for intercepting such a data packet; means for determining if the packet relates to a first mode of communication between the first and second nodes in which data packets generally bypass a home agent associated with the first node's home network, through which home agent packets would generally pass in a second mode of communication between the first and second nodes different to the first mode; and means for dropping the packet if it is so determined and if dropping of the packet is determined to be in accordance with a predetermined routing policy.

According to a third aspect of the present invention there is provided a method of controlling the sending of data packets from a first node towards a second node of a telecommunication network, the first node being a mobile node having an associated home network, and the method comprising: not sending such a packet if it would relate to a first mode of communication between the first and second nodes in which data packets generally bypass a home agent associated with the first node's home network, through which home agent packets would generally pass in a second mode of communication between the first and second nodes different to the first mode, unless the sending of such a packet is determined to be in accordance with a predetermined routing policy.

The method may comprise determining whether the sending of such a packet is in accordance with the routing policy in dependence on the packet's destination address.

The method may comprise determining whether the sending of such a packet is in accordance with the routing policy in dependence on the packet's source address.

The method may comprise determining that such a packet would relate to the first mode of communication if it is a control message associated with the first mode.

The method may comprise managing the routing policy in dependence on error messages received in response to the previous sending of such packets, the error messages indicating that the packets have been dropped.

The routing policy may specify at least one IP address range, the routing policy specifying for the or each range whether a packet having a destination address that falls within that range is allowed to be sent.

According to a fourth aspect of the present invention there is provided an apparatus for controlling the sending of data packets from a first node towards a second node of a telecommunication network, the first node being a mobile node having an associated home network, and the apparatus comprising: means for preventing the sending of such a packet if it would relate to a first mode of communication between the first and second nodes in which data packets generally bypass a home agent associated with the first node's home network, through which home agent packets would generally pass in a second mode of communication between the first and second nodes different to the first mode, unless the sending of such a packet is determined to be in accordance with a predetermined routing policy.

According to a fifth aspect of the present invention there is provided an operating program which, when run on an apparatus, causes the apparatus to carry out a method according to the first or third aspect of the present invention.

According to a sixth aspect of the present invention there is provided an operating program which, when loaded into an apparatus, causes the apparatus to become apparatus according to the second or fourth aspect of the present invention.

The operating program may be carried on a carrier medium. The carrier medium may be a transmission medium. The carrier medium may be a storage medium.

As described above, a problem with the 'route optimization' option of the Mobile IP standard is that the Mobile Node's home network has little control over the routing of the traffic flow between the Mobile Node and the Correspondent Node. The bidirectional tunneling option, on the other hand, allows the home network to control functions such as charging, policies, user services etc related to 'its' Mobile Node.

An embodiment of the present invention retains the benefits of the known 'route optimization' method, whilst addressing the above problem relating to the lack of control for the home network.

An embodiment of the present invention relates to a policing function and a policing device that can be controlled from a remote location (such as, for example, the home network). By using this policing function, optimized routing can be controlled and restricted for certain destinations. The policing function and device can be implemented in an Access Router (AR) or in the Mobile Node or a combination of these.

To manage the lists from a remote location, a management protocol is used.

In this way, the home network is able to exercise more control over how or whether a terminal does route optimization (the Visited Network or a third party policy repository may also exercise this control; additionally, a combination of home and visited network policies is also possible). To this end, various solutions are presented below.

One element may be a policing unit in the MN's Access Router (AR, or other access node), which checks BU messages sent by MN's and/or user data packets. It is able to reject those messages and/or traffic if the MN is not entitled to perform route optimization towards that particular CN.

An embodiment of the present invention thereby enables network operators of the home network to have more control of the routing of 'its' mobile node. An embodiment of the present invention also arrives at the same technical result as more complex solutions previously known.

An embodiment of the present invention provides a method of controlling the flow of IP packets between a Mobile Node and Correspondent Nodes over an IP network, where the Mobile Node has a subscription to a home network and is currently attached to a different, visited network, the method comprising: installing flow control policies at the Mobile Node and/or at an access router of the visited network, from the home network, these policies identifying IP addresses which the Mobile Node may communicate with out having to route packets via the home network; and at the Mobile Node and/or at the access router, rejecting at least certain packets sent directly to prohibited IP addresses.

An advantage of an embodiment of the invention is that the solution may be used by an operator of the home network to provide more control of the routing of traffic associated with its mobile nodes.

The allowed IP addresses of the flow control policies may be defined by one or both of a set of allowed IP addresses and a set of prohibited IP addresses. A set of addresses may be specified as one or more address ranges.

In an embodiment of the present invention, said flow control policies cause the Mobile Node and/or the access router to intercept packets associated with a route optimisation procedure as defined for Mobile IP. Only packets relating to a Binding process may be intercepted, e.g. a Binding Update message or a HoTI/CoTI message, and their destination addresses subjected to comparison with allowed or denied addresses.

The method comprises comparing the destination address of a packet at the Mobile Node or access router against IP addresses identified by the policies. Additionally, where the packet contains a type 2 Routing Header according to Mobile IP, the method may comprise comparing the type 2 Routing Header address against IP addresses identified by the policies, the message being rejected either the destination address or the type 2 Routing Header address is disallowed.

The flow control policies may comprise a rule disallowing the sending of packets from the Mobile Node and which have a local address of the visited network as source address. This may be used to prevent the Mobile Node setting up direct, i.e. non-Mobile IP based, sessions with a Correspondent Node.

In an embodiment of the invention, said flow control policies are installed at the access router. In the event that a packet is rejected by the access router on the basis of the policies, a notification may be sent to the Mobile Node. The Mobile Node may record this fact to prevent subsequent retries at sending the same packet. The Mobile Node may record the error message to prevent subsequent attempts to communicate directly or perform route optimisation with the same Correspondent Node.

The policing function and device can be implemented in an Access Router (AR) or in the Mobile Node.

To manage the lists from a remote location, a management protocol is used.

In the case of a 3GPP architecture, said access router may be a GPRS Gateway Support Node (GGSN), in which case the policies are installed in the GGSN via a Policy Charging Rules Function (PCRF) of the visited network.

In an embodiment of the invention, the home network may deliver general policy statements to the visited network, the visited network translating these statements into explicit IP addresses or address ranges.

The visited network may install its own policies into the access router and/or Mobile Node in addition to those installed by the home network.

DETAILED DESCRIPTION OF THE PREFERRED EMBODIMENTS

An embodiment of the present invention proposes extensions to the Mobile Node and/or in one or more of the Access Routers described above with reference to FIGS. 1 and 2. Before specific embodiments of the present invention are described with reference to FIGS. 3 and 4, an overview of techniques embodying the present invention will first be provided.

It is desirable to provide a network operator with an option to force traffic travelling between a roaming Mobile Node ("owned" by the network operator) and a Correspondent Node through the home network. There are a number of reasons why such home network routing may be desirable, both from the operator's point of view and from the user point of view, for example to facilitate legal interception of voice calls within the home network.

Two general approaches to providing the necessary control are presented here. The first approach relies upon policy enforcement at access routers within a visited network. The other approach relies upon policy enforcement at the Mobile Node.

Policy Enforcement at the Access Router

This approach relies upon the provision at an access router of an allowed and/or disallowed set of IP addresses, typically in the form of address ranges. For example, an allowed range of address may be IP addresses belonging to the home network and/or to the visited network. The list(s) is(are) contained in a subscriber profile downloaded by the access router at registration of a subscriber. In the case of 3GPP, this profile is obtained from the subscriber's home network (HSS) by a Policy Charging Rules Function (PCRF) which installs the profile into the access router (in this case a GPRS Gateway Support Node or GGSN). Packets received at the access router from a visiting Mobile Node are screened to identify packets which relate to Route Optimisation: in particular, Binding Update messages (and/or HoTO and CoTI messages where employed) are intercepted by the access router. When such packets are identified, the destination address of the packet is compared against the IP addresses contained in the allowed and/or denied lists.

In the event that a destination address is an allowed address, the message is allowed to proceed through the access router. On the other hand, if the address is not allowed, the access router will drop the message and respond to the Mobile Node with an error message, e.g. an Internet Control Message Protocol (ICMP) message. Upon receipt of the error message, the Mobile Node may drop repeat attempts to implement route optimisation with the same Correspondent Node. Indeed, the Mobile Node may include functionality that places a flag against Correspondent Node addresses (e.g. in an address book) to indicate that route optimisation is disallowed for these Correspondent Nodes.

It is noted that the policy control function may check not only the destination address field of the IP packet, but also any type 2 Routing Headers, as the Correspondent Node itself can be mobile. The policy may allow or disallow packets to type 2 Routing Headers according to the same lists defined for destination addresses (at the discretion of the home network).

The above solution assumes that a Mobile Node will only attempt to communicate directly with a Correspondent Node using the route optimisation procedure. However, in some cases, a Mobile Node may try to circumvent the solution, deliberately or not, by communicating directly with a Correspondent Node without invoking Mobile IP, i.e. omitting the Mobile IP header from packets and including the Care-of Address as the source address and the address of the Correspondent Node as the destination address. Of course, the resulting IP session would be terminated when the Mobile Node switches to a new access router, but this may not be a problem for say web browsing where a new (Care-of) IP address is allocated for each web download.

A solution to this problem is to implement a policy at the access router which rejects outgoing packets where the source address of the packets is a local address (of the access router) and where the IP address of the Correspondent Node is disallowed for the Mobile Node. The access router may check if there is a Home Address Destination option in the outgoing packet. If so, then it is a packet sent using MIPv6 route optimisation. If not, then it is simply a packet sent from the local destination. The policy list may include rules for either or both cases.

Alternatively the units of the AR can also govern the use of a local IP address by the MN for communication. That is, a second list can be managed in the AR and allow the MN to communicate toward CNs, which are positively on the list using a local IP address as source address. Such communication achieves optimal routing between CN and MN and, in addition, it omits the overhead of MIPv6 route optimization (at the expense of sessions breaking at handover).

Policy control may be based upon one or a combination of the approaches described above.

Policy Enforcement at the Mobile Node

An alternative approach to policy enforcement is to implement the enforcement function at the Mobile Node as opposed to the access router. This might employ either or both of the approaches described above, i.e. the message type approach and the source address approach. Again, the allowed and/or denied lists may be managed by the home network using an explicit Mobile Node to home network protocol. Policies may be pushed to the Mobile Node, e.g. using the Short Messaging Service. Some anti-tampering functionality may be required at the Mobile Node to prevent users altering the policies defined by the home network.

Specific embodiments of the present invention will now described with reference to FIGS. 3 and 4.

Figure 3:
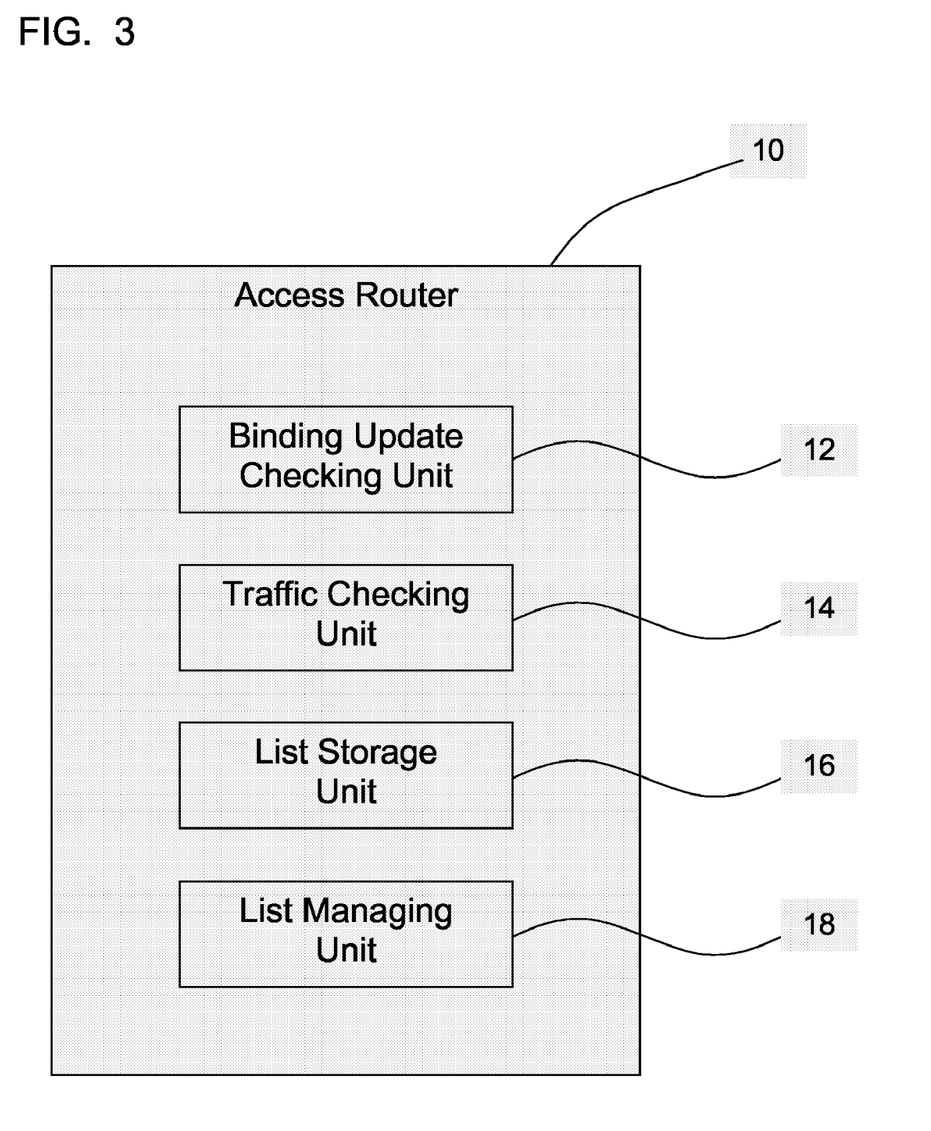
FIG. 3 is a block diagram showing an Access Router according to an embodiment of the present invention.

FIG. 3 is a block diagram showing an Access Router 10 according to an embodiment of the present invention. The Access Router 10 comprises a Binding Update (BU) Checking Unit 12, a Traffic Checking Unit 14, a List Storage Unit 16, and a List Managing Unit 18. The AR 10 here refers to the AR in the visited network of the MN (or its home network if no roaming is involved); no changes would be required in the AR of the CN.

Both the Binding Update Checking Unit 12 and the Traffic Checking Unit 14 have access to a list of IPv6 address ranges stored in the List Storage Unit 16 that specify which CNs a particular MN is allowed to perform route optimization toward. Such a list can contain a combination of allow/deny rules. The list may be managed from the home network, visited network, a combination of the two, or from an independent policy repository, using the List Managing Unit 18 of the Access Router 10. The list items may refer to any or both of the local or home address of the CNs.

The Binding Update Checking Unit 12 captures each packet sent by a MN and checks if it formed as a BU message and/or a Home Test Init (HoTI) message and/or a Care-of Test Init (CoTI) message. If yes, and the destination CN is not allowed according to the list in the List Storage Unit 16, the AR 10 drops the message and responds with an error message, such as an ICMP (Internet Control Message Protocol) Administratively prohibited (or other) message. Sending an error message is not required but may enhance performance, as the MN will then drop the attempt for route optimization without lengthy retries, if it understands the reply.

The Traffic Checking Unit 14 captures each packet sent to a CN and discards any packet that is sent to a CN with a local IP address as the source address, unless the CN address is allowed by the list of IPv6 addresses in the List Storage Unit 16. The unit 14 may check if there is a Home Address Destination option in the uplink packet. If so, then it is a packet sent using MIPv6 route optimization. If not, then it is simply a packet sent from the local destination. The policy list may include rules for either or both cases.

The two units 12 and 14 can be used in conjunction, and may each have separate policy lists in the List Storage Unit 16. The units 12 and 14 check not only the Destination Address field of the IP packet, but also any potential type 2 Routing Headers, as the CN itself might be mobile too. In case of a mobile CN, the policy of the list might be applied to both the home and care-of address of the CN, at the discretion of the Home Network, for example.

With MIPv6 route optimization, applications use the home address of the MN, so that sockets are bound to that address in both the MN and CN. Additional mechanisms (MIPv6 route optimization) are used to still deliver the packets directly between the MN and CN (that is using their local or care-of addresses).

Alternatively, the units 12 and 14 of the AR 10 can also govern the use of a local IP address by the MN for communication. That is, a further list can be managed by the List Managing Unit 18 in the List Storage Unit 16 of the AR 10, and allow the MN to communicate toward CNs that are positively on the further list, using a local IP address as source address. With the further list, the AR 10 looks for non-MIPv6 route optimization packets and checks the destination of those. Such communication achieves optimal routing between CN and MN and, in addition, omits the overhead of MIPv6 route optimization. This alternative is weaker, as sessions break on mobility, but is still attractive; for example Web browsing may not need such mobility.

With an Access Router 10 as described above, an embodiment of the present invention does not require the MN to have any extensions over existing Mobile Nodes; the MN will try to initiate route optimization towards CNs with which it frequently communicates, and will simply be rejected if such is not allowed. However, a MN that does have extensions over existing Mobile Nodes will now be described with reference to FIG. 4; the MN of FIG. 4 can be used in conjunction with, or instead of, the extensions to the AR described above with reference to FIG. 3. In particular, the MN of FIG. 4 comprises a unit that decides on route optimization.

Figure 4:
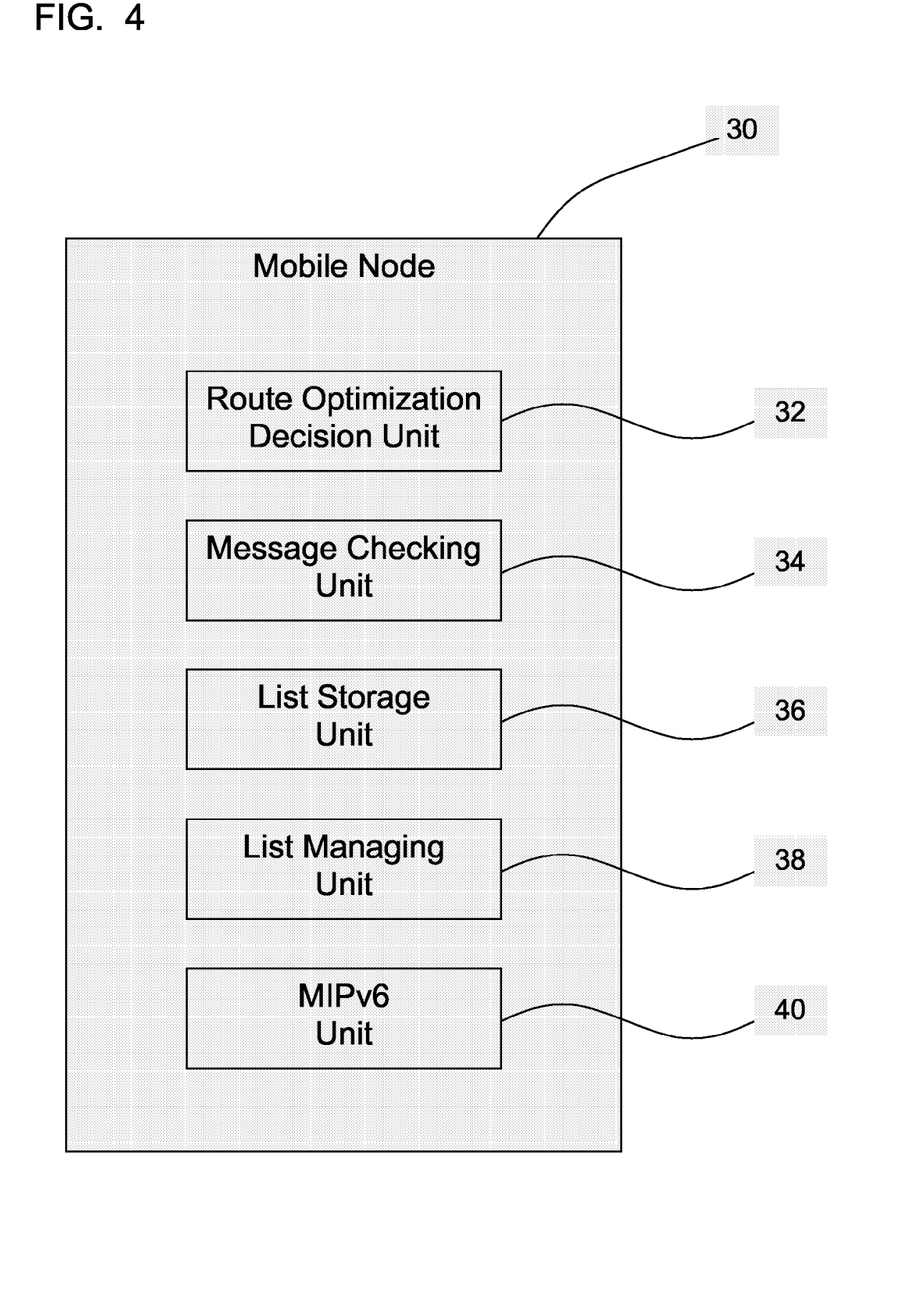
FIG. 4 is a block diagram showing a Mobile Node according to an embodiment of the present invention.

FIG. 4 is a block diagram showing a Mobile Node 30 according to an embodiment of the present invention. The mobile Node 30 comprises a Route Optimization Decision Unit 32, a Message Checking Unit 34, a List Storage Unit 36, a List Managing Unit 38 and a MIPv6 Unit 40.

The Route Optimization Decision Unit 32 has access to a list of IPv6 address ranges stored in the List Storage Unit 36 similar to the lists described above with reference to the Access Router 10 of FIG. 3, specifying which CNs the MN 30 is allowed to perform route optimization toward.

The following two methods of managing this list, using the List Managing Unit 38, may apply; one or both of these methods can be active at any one time:

First Method: the list in the List Storage Unit 36 is managed from the home network, using the List Managing Unit 38 of the Mobile Node 30. With this method, the Route Optimization Decision Unit 32 of the Mobile Node 30 will only cause route optimization to be initiated towards those CNs whose address is allowed by the list in the List Storage Unit 36. An explicit Home Network to MN protocol can be applied in this case.

Second Method: the list is managed by using the Message Checking Unit 34 to intercept the ICMP (Internet Control Message Protocol) Administratively Prohibited messages, sent by the AR 10 in response to MIPv6 Route Optimization signalling messages as described above with reference to FIG. 3. The List Managing Unit 38 of the MN 30 would then put the destination CN in question on the list (with prohibit flag) stored in the List Storage Unit 36, and this would prevent the Optimization Decision Unit 32 attempting to initiate route optimization towards those destinations using the MIPv6 Unit 40.

Alternatively, the Optimization Decision Unit 32 of the MN 30 can also govern the use of a local IP address for communication. That is, a further list can be managed in the MN 30 and communication toward CNs that are positively on the list can be then performed using a local IP address. Such communication achieves optimal routing between CN and MN and, in addition, omits the overhead of MIPv6 route optimization (at the expense of possible session breaking at handover). This is also discussed above in relation to FIG. 3.

Further details of how the home network can control routing in an embodiment of the present invention will now be described.

It is the home network that has a subscription with the user (of the mobile node) to provide telecommunication services. In a roaming situation, the visited network executes some of these services (or components thereof) on behalf of the home network based on a roaming agreement between the home and visited network operators.

Since the home network is responsible to provide the service, it needs complete control over how the service is delivered. Part of the benefit of an embodiment of the present invention derives from the possibility for the home network to control route optimization (i.e., one aspect of service delivery). Existing policy control nodes and interfaces (e.g., of the 3GPP or TISPAN architectures, where TISPAN is the Telecoms & Internet converged Services & Protocols for Advanced Networks) can be extended to include route optimization control.

The actual list of Correspondent Node addresses towards which route optimization is permitted/denied can be assembled during a process coordinated between the home and visited networks.

In the simplest case, the home network would send a list of IP address ranges for which to allow or deny route optimization, for example when the MN attaches to the visited network. (The home network would also specify for each item on the list whether that item is allowed or denied as a local or home CN address).

The home network may also dynamically adjust the initial list, for example when a particular service is instantiated and for example when the address of a serving network node becomes known.

The visited network can also play a part in composing the address list. In this case, the home network might send only a general description for parts of the list instead of specific IP address ranges. Such a description could relate, for example, to particular services, user groups situations and correspondent nodes. Examples include:

"Video servers in the visited network". This example refers to a pre-agreed set of servers in the visited network. It is the responsibility of the visited network to substitute the correct IP addresses. This method enables the visited network to change the number and address of the servers in question without notifying the home network.

"Public internet destinations". In this case the IP address range is assembled from the public Border Gateway Protocol (BGP) advertisements heard by the visited network. This method alleviates the need to communicate the (potentially long) list of these address ranges.

"Local destinations". This method may refer to all MNs currently served by the visited network.

With an embodiment of the present invention, home networks are able to control route optimization for their MN's traffic. The assistance of the visited network is usually required and assumed.

The home network may execute various policies, such as:
All traffic of the user must always be sent home.
All traffic of the user can be route optimized.
All traffic of the user can be route optimized except for the ones sent to the home service network or any affiliated third party service networks.

Traffic that is to be lawfully intercepted at home can be denied route optimization.

Traffic towards particular networks can be selectively allowed or denied route optimization. For example, if the given network has better or guaranteed connectivity through the home network, traffic to it may be denied route optimization.

Traffic towards (a portion of) the visited network's service network can be allowed route optimization, for example based on a service delivery agreement between the home and visited networks, which specifies that the visited network provides certain resources to provide the service in question.

To manage the lists from a remote location, such as the home network, the visiting network, an independent policy repository or a combination thereof, a management protocol is used. This protocol can be based on enhancements to known protocols such as the COPS (Common Open Policy Service) protocol (RFC 2748), the Diameter protocol (RFC3588, RFC4004) or it can also be an explicit new protocol. The most common situation is to manage the lists from the home network as it is the network operator for the home network that wants to control how the mobile node performs route optimization.

It will be appreciated that operation of one or more of the above-described components can be controlled by a program operating on the device or apparatus. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

What is claimed is:

1. A method of controlling the routing of a data packet sent from a first node towards a second node of an Internet Protocol (IP)-based telecommunication network, the first node being a mobile node having an associated home network that is different from the IP-based telecommunication network, the method comprising performing the following steps in a first access router of the home network or in a second access router of a visited network depending on whether the first node is operating in the home network or has roamed outside of its home network into the visited network, respectively:

storing a predetermined routing policy received from the home network to control routing of the data packet from the first node to the second node;

intercepting the data packet;

determining if the packet relates to a first mode of communication between the first and second nodes in which data packets bypass a home agent associated with the first node's home network, through which home agent packets would pass in a second mode of communication between the first and second nodes different from the first mode; and dropping the packet if it is determined that the packet relates to the first mode and if dropping of the packet is determined to be in accordance with the predetermined routing policy.

2. The method as claimed in claim 1, comprising determining whether the dropping of the packet is in accordance with the routing policy based on the packet's destination address.

3. The method as claimed in claim 2, wherein the destination address is one of a home address and a care-of-address.

4. The method as claimed in claim 1, comprising determining whether the dropping of the packet is in accordance with the routing policy based on the packet's source address.

5. The method as claimed in claim 2, further comprising:
determining whether the dropping of the packet is in accordance with the routing policy based on the packet's source address; and
determining that the packet should be dropped if the packet's source address is a local address, unless the delivery of such a packet is allowed by the routing policy according to the packet's destination address.

6. The method as claimed in claim 1, comprising determining whether the dropping of the packet is in accordance with the routing policy based on a routing header in the packet.

7. The method as claimed in claim 1, comprising determining that the packet relates to the first mode of communication if it relates to a control message associated with the first mode.

8. The method as claimed in claim 1, wherein the first mode of communication is a route optimization mode of the Mobile IP standard and the second mode is a bidirectional tunneling mode of the Mobile IP standard.

9. The method as claimed in claim 8, wherein the first mode of communication is a route optimization mode of the Mobile IP standard and control messages associated with the first mode comprise at least one type of IPv6 mobility message.

10. The method as claimed in claim 8, wherein the packet relates to the first mode of communication if it relates to a control message associated with the first mode, and control messages associated with the first mode comprise at least one of the following types of message: a Binding Update message; a Home Test Init Message; and a Care-of Test Init message.

11. The method as claimed in claim 1, comprising determining whether the packet relates to the first mode of communication based on at least one of the packet's source and destination address.

12. The method as claimed in claim 1, wherein the second node is a stationary node.

13. The method as claimed in claim 1, further comprising sending an error message to the first node if the packet is dropped.

14. The method as claimed in claim 13, wherein the error message is an Internet Control Message Protocol (ICMP) Administratively prohibited message.

15. The method as claimed in claim 1, wherein the routing policy specifies at least one IP address range, the routing policy specifying for the IP address range whether a packet having a source address that falls within that range is to be dropped or allowed.

16. The method as claimed in claim 1, wherein the routing policy specifies at least one IP address range, the routing policy specifying for the IP address range whether a packet having a destination address that falls within that range is to be dropped or allowed.

17. The method as claimed in claim 1, wherein the IP-based telecommunication network is based on at least one of the IP protocols IPv4 and IPv6.

18. The method as claimed in claim 1, further comprising supporting the management of the routing policy from a remote location.

19. The method as claimed in claim 18, further comprising supporting the management of the routing policy remotely via management signaling.

20. The method as claimed in claim 19, wherein the management signaling uses any of the Diameter or Common Open Policy Service (COPS) protocols.

21. An access router for controlling the routing of a data packet sent from a first node towards a second node of an Internet Protocol (IP)-based telecommunication network, the first node being a mobile node having an associated home network that is different from the IP-based telecommunication network, and the access router comprising:

means for storing a predetermined routing policy received from the home network to control routing of the data packet from the first node to the second node;

means for intercepting the data packet;

means for determining if the packet relates to a first mode of communication between the first and second nodes in which data packets bypass a home agent associated with the first node's home network, through which home agent packets would pass in a second mode of communication between the first and second nodes different from the first mode; and means for dropping the packet if it is determined that the packet relates to the first mode and if dropping of the packet is determined to be in accordance with the predetermined routing policy.

22. A method of controlling the sending of a data packet from a first node towards a second node of a telecommunication network, the first node being a mobile node having an associated home network that is different from the telecommunication network, and the method comprising performing the following steps in the first node:

storing a predetermined routing policy received from the home network to control routing of the data packet from the first node to the second node;

determining whether the packet relates to a first mode of communication between the first and second nodes in which data packets bypass a home agent associated with the first node's home network, through which home agent packets would pass in a second mode of communication between the first and second nodes different from the first mode, wherein the packet is determined to relate to the first mode of communication when the packet is a control message associated with the first mode;

determining whether the sending of such a packet is in accordance with the predetermined routing policy; and preventing the sending of the packet if the packet relates to the first mode of communication, unless the sending of the packet is determined to be in accordance with the predetermined routing policy.

23. The method as claimed in claim 22, comprising determining whether the sending of such a packet is in accordance with the routing policy based on the packet's destination address.

24. The method as claimed in claim 22, comprising determining whether the sending of such a packet is in accordance with the routing policy based on the packet's source address.

25. The method as claimed in claim 22, comprising managing the routing policy based on error messages received in response to the previous sending of such packets, the error messages indicating that the packets have been dropped.

26. The method as claimed in claim 22, wherein the routing policy specifies at least one IP address range, the routing policy specifying for the IP address range whether a packet having a destination address that falls within that range is allowed to be sent.

27. A mobile node comprising an apparatus for controlling the sending of a data packet from the mobile node towards a second node of a telecommunication network, the mobile node having an associated home network that is different from the telecommunication network, and comprising:

means for allowing the home network to provide a predetermined routing policy to override a packet routing decision by the mobile node;

means for storing the predetermined routing policy;

means for determining if the packet relates to a first mode of communication between the mobile node and the second node, wherein in the first mode, data packets bypass a home agent associated with the mobile node's home network, and wherein home agent packets pass through the home agent in a second mode of communication between the mobile node and the second node different from the first mode, wherein the packet is determined to relate to the first mode of communication when the packet is a control message associated with the first mode; and means for performing one of the following when the packet relates to the first mode of communication:

sending the packet to the second node only if the sending of the packet is determined to be in accordance with the predetermined routing policy, and preventing the sending of the packet if instructed so in the predetermined routing policy.

28. A non-transitory memory of a controller in a mobile node of a telecommunication network, said memory storing an operating program comprising software code portions received from a home network associated with the mobile node for controlling the sending of a data packet from the mobile node towards a second node of the telecommunication network, wherein the telecommunication network is different from the home network, said operating program causing the controller to perform the following steps when the operating program is run on a processor of the controller:

allowing the home network to store a predetermined routing policy in said non-transitory memory to control the sending of the data packet from the mobile node to the second node;

determining whether the packet relates to a first mode of communication between the mobile node and the second node in which data packets bypass a home agent associated with the mobile node's home network, wherein the packet is determined to relate to the first mode of communication when the packet is a control message associated with the first mode;

determining whether the sending of such a packet is in accordance with the predetermined routing policy; and preventing the sending of the packet if the packet relates to the first mode of communication, unless the sending of the packet is determined to be in accordance with the predetermined routing policy.

29. A non-transitory memory of an access router, said memory storing an operating program comprising software code portions received from a home network associated with a mobile node for controlling the routing of a data packet sent from the mobile node towards a second node of an Internet Protocol (IP)-based telecommunication network, wherein the IP-based telecommunication network is different from the home network, said operating program causing the access router to perform the following steps when the operating program is run on a processor of the access router:

storing a predetermined routing policy received from the home network to control routing of the data packet from the mobile node to the second node;

intercepting the data packet;

determining if the packet relates to a first mode of communication between the mobile node and the second node in which data packets bypass a home agent associated with the mobile node's home network; and dropping the packet if it is determined that the packet relates to the first mode and if dropping of the packet is determined to be in accordance with the predetermined routing policy.

* * * * *

UNITED STATES PATENT AND TRADEMARK OFFICE
CERTIFICATE OF CORRECTION

PATENT NO.           : 8,144,645 B2                                             Page 1 of 1
APPLICATION NO.      : 12/097909
DATED                : March 27, 2012
INVENTOR(S)          : Turanyi et al.

Figure 1:
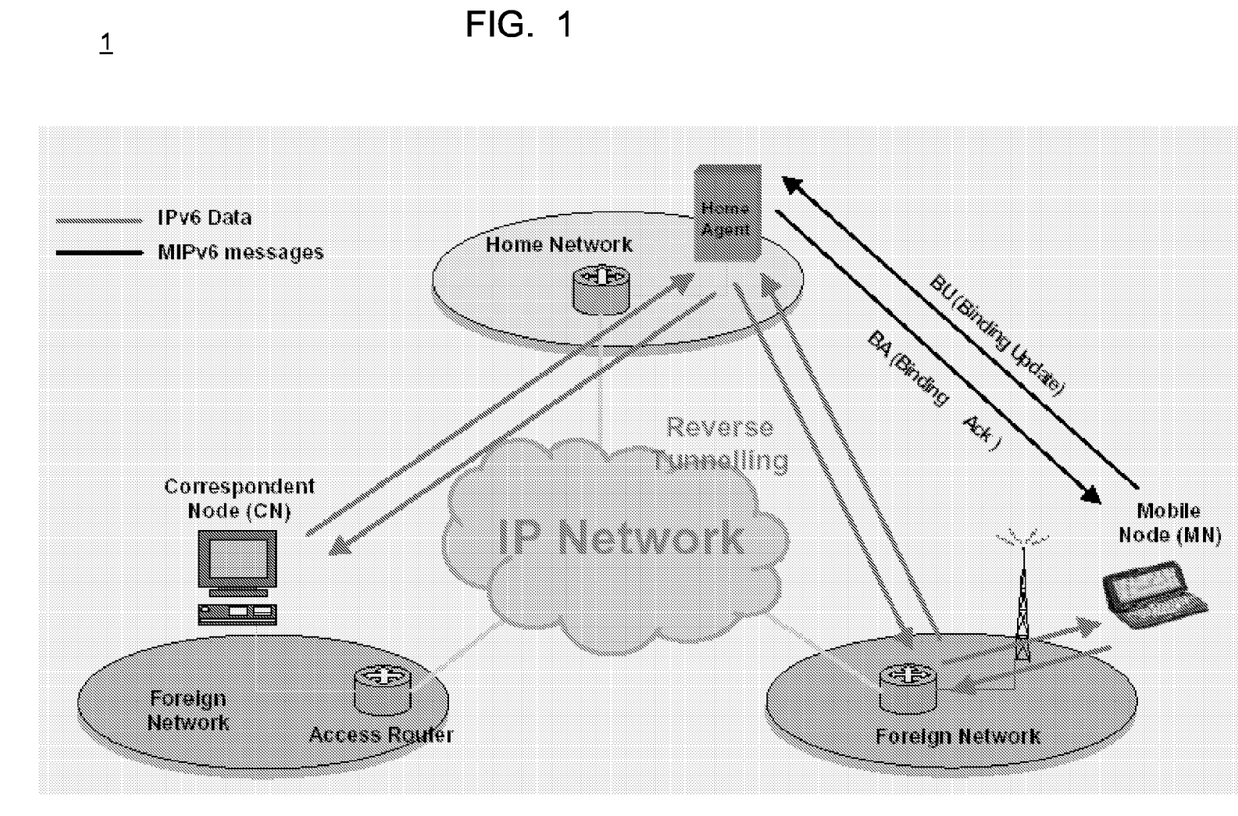
FIG. 1, discussed hereinbefore, illustrates the bidirectional tunneling mode of Mobile IP.
Figure 2:
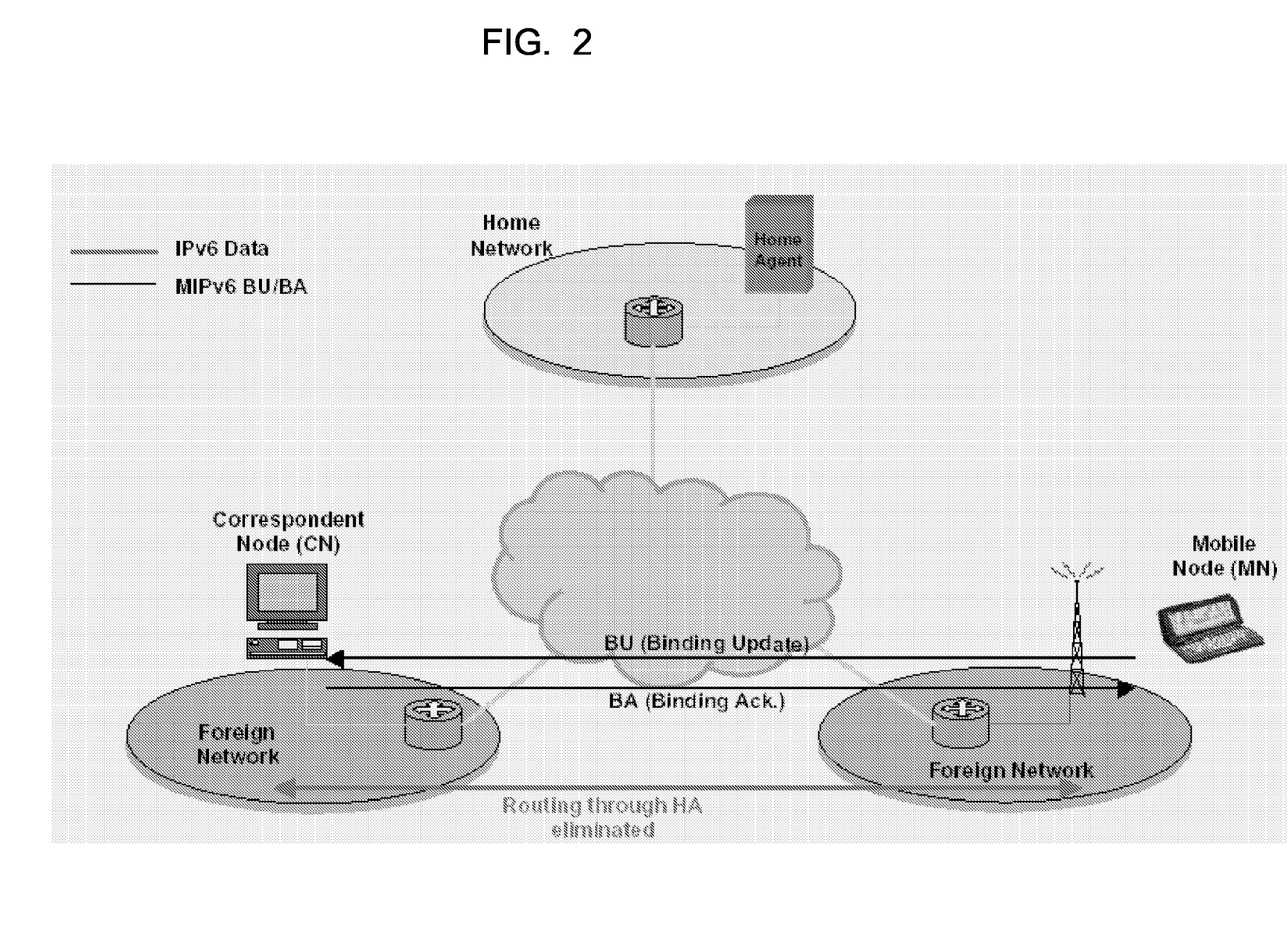
FIG. 2, also discussed hereinbefore, illustrates the route optimization mode of Mobile IP.

It is certified that error appears in the above-identified patent and that said Letters Patent is hereby corrected as shown below:

In Fig. 1, Sheet 1 of 4, delete "1".

In Column 9, Line 18, delete "HoTO" and insert -- HoTI --, therefor.

Signed and Sealed this
Twenty-sixth Day of June, 2012

David J. Kappos
*Director of the United States Patent and Trademark Office*